(12) United States Patent  
Tu et al.

(10) Patent No.: US 12,209,546 B2
(45) Date of Patent: Jan. 28, 2025

(54) PREDICTIVE EGR CONTROL METHOD AND TERMINAL DEVICE, AND STORAGE MEDIUM

(71) Applicant: Xiamen Yaxon Zhilian Technology Co., Ltd., Fujian (CN)

(72) Inventors: Yankai Tu, Fujian (CN); Yuan Chen, Fujian (CN)

(73) Assignee: Xiamen Yaxon Zhilian Technology Co., Ltd., Fujian (CN)

( * ) Notice: Subject to any disclaimer, the term of this patent is extended or adjusted under 35 U.S.C. 154(b) by 0 days.

(21) Appl. No.: 18/015,413

(22) PCT Filed: Aug. 18, 2020

(86) PCT No.: PCT/CN2020/109686
§ 371 (c)(1),
(2) Date: Jan. 10, 2023

(87) PCT Pub. No.: WO2022/007110
PCT Pub. Date: Jan. 13, 2022

(65) Prior Publication Data
US 2023/0287838 A1    Sep. 14, 2023

(30) Foreign Application Priority Data

Jul. 10, 2020   (CN) .......................... 202010662360.3

(51) Int. Cl.
*F02D 41/00*    (2006.01)
*B60W 30/18*    (2012.01)
(Continued)

(52) U.S. Cl.
CPC ......... *F02D 41/0077* (2013.01); *B60W 30/18* (2013.01); *F02D 41/0052* (2013.01);
(Continued)

(58) Field of Classification Search
CPC .. F02D 41/0077; F02D 41/0052; F02D 41/12; F02D 41/1497; F02D 2041/1412;
(Continued)

(56) References Cited

U.S. PATENT DOCUMENTS 10,293,825 B2   5/2019  Hall et al.
2017/0080945 A1*   3/2017  Hall ...................... B60W 10/02
(Continued)

FOREIGN PATENT DOCUMENTS

CN   106089393 A   11/2016
CN   108556838 A   9/2018
(Continued)

OTHER PUBLICATIONS

International Search Report cited in PCT/CN2020/109686 mailed Apr. 9, 2021, 8 pages.
(Continued)

*Primary Examiner* — Yi-Kai Wang
(74) *Attorney, Agent, or Firm* — Cooper Legal Group, LLC

(57) ABSTRACT

The disclosure relates to a predictive EGR control method and terminal device, and a storage medium. The method includes: calculating, if there is a slowdown section ahead of a vehicle, an engine output torque to be reduced for travelling from a current position to a start position of the slowdown section and/or an engine output torque to be increased for travelling from the start position of the slowdown section to an end position of the slowdown section, and thereby adjusting an EGR rate according to the engine output torque to be reduced or increased. Before the vehicle running at a high load enters the slowdown section, an EGR valve can be opened in advance to increase the EGR rate, thereby reducing harmful gas emissions.

10 Claims, 2 Drawing Sheets

(51) Int. Cl.
*F02D 41/12* (2006.01)
*F02D 41/14* (2006.01)

(52) U.S. Cl.
CPC ......... *F02D 41/12* (2013.01); *F02D 41/1497* (2013.01); *F02D 2041/1412* (2013.01); *F02D 2200/1002* (2013.01); *F02D 2200/501* (2013.01); *F02D 2250/21* (2013.01)

(58) Field of Classification Search
CPC ....... F02D 2200/1002; F02D 2200/501; F02D 2250/21; F02D 41/005; B60W 30/18; Y02T 10/40
USPC .................................................... 123/568.21
See application file for complete search history.

(56) References Cited

U.S. PATENT DOCUMENTS

| 2017/0129492 | A1* | 5/2017 | Follen | B60W 50/0097 |
| 2018/0128192 | A1* | 5/2018 | Sugiyama | F02D 41/0047 |
| 2018/0328296 | A1 | 11/2018 | Haga | |

FOREIGN PATENT DOCUMENTS

| CN | 108869082 A | 11/2018 |
| CN | 110329258 A | 10/2019 |
| CN | 110578610 A | 12/2019 |
| CN | 111255579 A | 6/2020 |

OTHER PUBLICATIONS

Written Opinion cited in PCT/CN2020/109686 mailed Apr. 9, 2021, 7 pages.

* cited by examiner

PREDICTIVE EGR CONTROL METHOD AND TERMINAL DEVICE, AND STORAGE MEDIUM

TECHNICAL FIELD

The present invention relates to the field of intelligent control of vehicles, and in particular to a predictive EGR control method and terminal device, and a storage medium.

BACKGROUND

An EGR (exhaust gas recirculation) system recirculates exhaust gas of the diesel engine into the engine for combustion to reduce the oxygen concentration in the combustion gas mixture and reduce the combustion temperature, thus reducing the amount of harmful gas NOx produced. Since the diesel engine uses oxygen-enriched combustion, the exhaust gas under a certain mixing rate will not affect the power (i.e., output torque with the same amount of fuel) of the engine. However, if the mixing rate exceeds a certain value, some of the output torque will be lost, but the amount of the harmful gas NOx will continue to decrease. Therefore, the general well-known principle for EGR control is: when the diesel engine runs at a low load, it does not require high power at this time, so a large EGR rate can be used; and when the diesel engine runs at a high load, considering the power demand, the EGR valve is closed at this time, but this will cause an increase in harmful gas NOx emissions. However, commercial vehicles usually run under heavy load for the sake of commercial efficiency, and diesel engines spend less time under light load, which poses a challenge for the full use of EGR, energy conservation and emission reduction.

SUMMARY

In order to solve the above problems, the present invention provides a predictive EGR control method and terminal device, and a storage medium.

The specific solutions are as follows:

Provided is a predictive EGR control method, including: determining, according to electronic horizon data ahead of a vehicle, whether there is a slowdown section ahead of the vehicle, and if so, calculating an engine output torque to be reduced for travelling from a current position of the vehicle to a start position of the slowdown section and/or an engine output torque to be increased for travelling from the start position of the slowdown section to an end position of the slowdown section, and thereby adjusting an EGR rate of the vehicle at the current position of the vehicle according to the engine output torque to be reduced and/or adjusting the EGR rate of the vehicle at the start position of the slowdown section according to the engine output torque to be increased.

Further, a method of calculating the engine output torque to be reduced includes: determining, according to a type of the slowdown section, a safe speed of vehicle travelling into the slowdown section, and calculating, based on a current speed of vehicle, the safe speed of vehicle travelling into the slowdown section, and a distance between the current position of the vehicle and the start position of the slowdown section, the engine output torque to be reduced for travelling from the current position of the vehicle to the start position of the slowdown section.

Further, a method of calculating the engine output torque to be reduced includes: calculating, based on the current speed of vehicle, the safe speed of vehicle travelling into the slowdown section, and the distance between the current position of the vehicle and the start position of the slowdown section, an acceleration of the vehicle uniformly slowing down from the current speed of vehicle to the safe speed of vehicle; calculating, based on the calculated acceleration and a total mass of the vehicle, a driving force to be reduced; and converting, according to driveline parameters of the vehicle, the driving force to be reduced into the engine output torque to be reduced.

Further, when the slowdown section is a multi-type composite section, the safe speed of vehicle travelling into the slowdown section is a minimum value in the safe speeds of vehicle corresponding to all types of sections.

Further, the safe speed of vehicle is a speed of vehicle reduced by m % relative to the current speed of vehicle, where $m \leq 5$.

Further, a method of adjusting the EGR rate of the vehicle according to the engine output torque to be reduced includes: adjusting, if the engine output torque to be reduced is greater than an engine output torque to be reduced for increasing the EGR rate of the vehicle from a current value to a maximum value, the EGR rate of the vehicle to the maximum value; otherwise, increasing the EGR rate of the vehicle such that an engine output torque is reduced by the engine output torque to be reduced.

Further, a method of calculating the engine output torque to be increased includes: calculating, based on the current speed of vehicle and an expected speed of vehicle travelling out of the slowdown section, the engine output torque to be increased for the vehicle travelling out of the slowdown section.

Further, a method of calculating the engine output torque to be increased includes: calculating, according to a type of the slowdown section, an acceleration increment of the vehicle travelling on the slowdown section; calculating, based on a current speed of vehicle, an expected speed of vehicle travelling out of the slowdown section, and a length of the slowdown section, an acceleration of the vehicle travelling out of the slowdown section at the expected speed of vehicle travelling out of the slowdown section from the current speed of vehicle; calculating, based on a total mass of the vehicle, an acceleration increment of the vehicle travelling on the slowdown section, and an acceleration of the vehicle travelling out of the slowdown section, a driving force to be increased; and converting, according to driveline parameters of the vehicle, the driving force to be increased into the engine output torque to be increased.

Further, when the slowdown section is downhill, the acceleration increment of the vehicle travelling on the slowdown section is a product of a gradient value and a gravity acceleration.

Further, when the slowdown section is a multi-type composite section, the acceleration increment of the vehicle travelling on the slowdown section is a sum of acceleration increments caused by all types of sections.

Further, a method of adjusting the EGR rate of the vehicle according to the engine output torque to be increased includes: reducing, according to a table of EGR rate-torque relationship, the EGR rate of the vehicle such that an engine output torque is increased by the engine output torque to be increased.

Further, when the vehicle travels out of the slowdown section, the EGR rate is adjusted such that the EGR rate is restored to the value before adjustment.

Provided is a predictive EGR control terminal device, including a processor, a memory, and a computer program stored in the memory and running in the processor. The processor, when executing the computer program, implements the steps in the method in the embodiments of the present invention.

Provided is a computer-readable storage medium having a computer program stored thereon. The computer program, when executed by a processor, implements the steps in the method in the embodiments of the present invention.

By using the technical solutions above, the present invention realizes predictive EGR control through the electronic horizon. By making full use of the information of the terrain ahead provided in the electronic horizon, before the vehicle running at a high load enters the slowdown section, an EGR valve can be opened in advance to increase the EGR rate, thereby reducing harmful gas emissions. At this time, the torque lost for reducing emissions can make the vehicle steadily slow down by a certain rate within an acceptable range. After the vehicle passes through the slowdown environment, the EGR rate is reduced or the EGR is turned off to restore the torque so that the speed of vehicle is increased to the original value. In this way, even in the case of heavy load, the time of the EGR being on can be fully increased by utilizing the terrain environment, thereby further achieving the effects of energy conservation and emission reduction.

DESCRIPTION OF EMBODIMENTS

Figure 1:
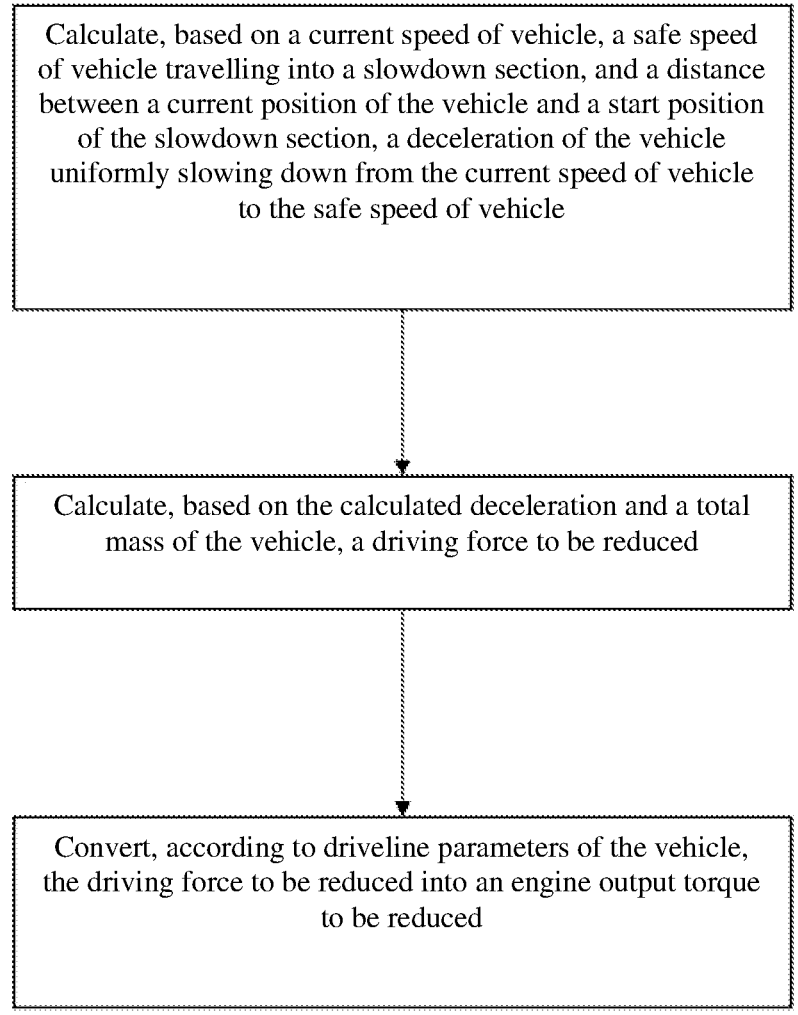
FIG. 1 is a flowchart showing a process of calculating an engine output torque to be reduced before a vehicle travels into a slowdown section according to Embodiment I of the present invention.

To further illustrate the embodiments, the accompanying drawings are provided in the present invention. These accompanying drawings are a part of the contents disclosed in the present invention that are mainly used to illustrate the embodiments, and can be used in conjunction with the related descriptions in the specification to explain the operation principle of the embodiments. With reference to these contents, those skilled in the art will be able to understand other possible implementations and advantages of the present invention.

The present invention will be further described in conjunction with the accompanying drawings and the specific implementations.

Embodiment 1

This embodiment of the present invention provides a predictive EGR control method, including: determining, according to electronic horizon data ahead of a vehicle, whether there is a slowdown section ahead of the vehicle, and if so, calculating an engine output torque to be reduced for travelling from a current position of the vehicle to a start position of the slowdown section and/or an engine output torque to be increased for travelling from the start position of the slowdown section to an end position of the slowdown section, and thereby adjusting an EGR rate of the vehicle at the current position of the vehicle according to the engine output torque to be reduced and/or adjusting the EGR rate of the vehicle at the start position of the slowdown section according to the engine output torque to be increased.

The slowdown section is a section of road that requires the vehicle to slow down in traffic regulations, including, but not limited to:

a) Downhill road ahead: The vehicle needs to slow down before going downhill, thereby reducing the energy consumption. While going downhill, the vehicle is restored to the original speed by utilizing gravitational potential energy, which has good economy.

b) Curve ahead: The vehicle needs to slow down before running into the curve, so as to reduce the energy consumption and ensure the safety, thereby avoiding consuming energy due to overuse of the braking system at the curve.

c) Intersection ahead: The vehicle needs to slow down when passing through the intersection, so as to reduce the energy consumption and ensure the safety, thereby avoiding consuming energy due to use of the braking system at the intersection.

d) Traffic signs that require slowdown ahead, such as School Ahead, Pedestrians Ahead, Road Work Ahead, Narrow Road Ahead, Reduced Speed Limit Ahead, etc.

e) Tunnel or bridge ahead.

f) Merging traffic ahead.

g) Changes in vehicle situation ahead, such as Lane Narrows, Number Of Lanes Reduced, etc.

The predictive EGR control method provided in this embodiment of the present invention will be described in detail below by an example of the downhill-type slowdown section. It should be noted that in the implementation below, the adjustment is made at the same time for two different cases, i.e., for both the process of travelling from the current position of the vehicle to the start position of the slowdown section, and the process of travelling from the start position of the slowdown section to the end position. In other embodiments, the adjustment may also be made for one case only.

(1) The engine output torque to be reduced for travelling from the current position to the start position of the slowdown section is calculated, and thereby the EGR rate of the vehicle is adjusted.

A gradient $\theta$ and a slope length L of the downhill section ahead, and a distance $D_i$ between the start position of the downhill section and the current position of the vehicle can be acquired from the electronic horizon data, and a current speed of vehicle $V_i$ can be obtained from an on-board computer.

In this embodiment, preferably, a safe speed of vehicle $V_k$ for the downhill-type slowdown section is set to be a speed of vehicle reduced by m % relative to the current speed of vehicle $V_i$. In order not to affect the driving experience, preferably, m≤5. In other embodiments, those skilled in the art can also set other calculation manners for the safe speed of vehicle, or directly set a certain maximum speed of vehicle. In this embodiment, setting the safe speed of vehicle to be the speed of vehicle reduced by m % relative to the current speed of vehicle can ensure safety on the premise of not affecting the driving experience.

As shown in FIG. 1, the engine output torque to be reduced $\Delta T_1$ can be calculated according to the above data. The specific calculation process includes the following steps:

Step 1: Calculate, based on the current speed of vehicle $V_i$, the safe speed of vehicle $V_k$ travelling into the slowdown section, and the distance $D_i$ between the current position of the vehicle and the start position of the slowdown section, an acceleration $a_1$ of the vehicle uniformly slowing down from the current speed of vehicle $V_i$ to the safe speed of vehicle $V_k$.

$$a_1 = \frac{V_k^2 - V_i^2}{2D_i}$$

Step 2: Calculate, based on the calculated acceleration $a_1$ and a total mass M of the vehicle, a driving force to be reduced $\Delta F_1$:

$$\Delta F_1 = Ma_1$$

When the vehicle is running steadily at an approximately constant speed, the engine output torque and the environmental resistance are steady. Assuming that the vehicle is always running steadily at a constant speed, then the driving force to be reduced for achieving the deceleration $a_1$ while maintaining the current throttle opening is about $\Delta F_1 = M a_1$. The total mass M of the vehicle can be estimated according to the load of the vehicle and the speed of vehicle, or provided by other load sensors.

Step 3: Convert, according to driveline parameters of the vehicle, the driving force to be reduced $\Delta F_1$ into the engine output torque to be reduced $\Delta T_1$.

After the engine output torque to be reduced $\Delta T_1$ is obtained, step 4 may be performed: adjust the EGR rate of the vehicle.

In this embodiment, considering that the EGR rate cannot exceed a maximum value $R_{max}$, the adjustment method includes: when the engine output torque to be reduced is greater than an engine output torque to be reduced for increasing the EGR rate of the vehicle from a current value to the maximum value $R_{max}$, the EGR rate of the vehicle is adjusted to the maximum value $R_{max}$; otherwise, the EGR rate of the vehicle is increased such that an engine output torque is reduced by the engine output torque to be reduced $\Delta T_1$.

It should be noted that the slowdown section may be not only a single-type section, but also a multi-type composite section. For example, the slowdown section may include both a curve and a downhill slope, and also have a School Ahead sign. In this case, the safe speed of vehicle travelling into this slowdown section is a minimum value in the safe speeds of vehicle corresponding to all types of sections.

(2) The engine output torque to be increased for travelling from the start position to the end position of the slowdown section is calculated, and thereby the EGR rate of the vehicle is adjusted.

Specifically, when the vehicle travels to the start position of the slowdown section, the engine output torque to be increased for the vehicle travelling out of the slowdown section is calculated based on the current speed of vehicle and an expected speed of vehicle travelling out of the slowdown section, and the EGR rate of the vehicle is adjusted according to the engine output torque to be increased.

The description will be made in detail below also by an example of the downhill-type slowdown section.

Figure 2:
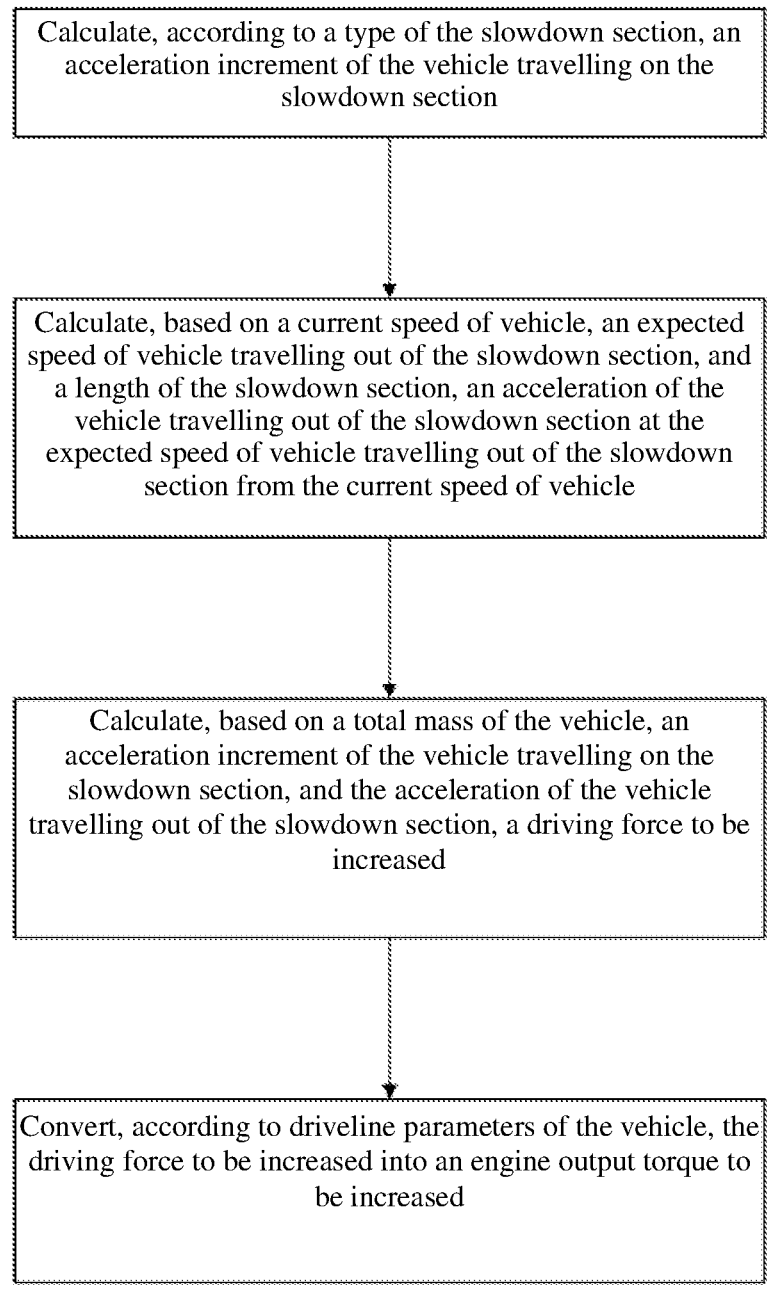
FIG. 2 is a flowchart showing a process of calculating an engine output torque to be increased after the vehicle travels into the slowdown section according to this embodiment.

The engine output torque to be increased $\Delta T2$ can be calculated according to the data obtained from the electronic horizon data. As shown in FIG. 2, the specific calculation process includes:

Step 1: Calculate, according to the type of the slowdown section, an acceleration increment $\Delta a$ of the vehicle travelling on the slowdown section:

$$\Delta a = \theta g$$

where g is the gravity acceleration.

Step 2: Calculate, based on the current speed of vehicle, the expected speed of vehicle travelling out of the slowdown section, and the length of the slowdown section, an acceleration $a_2$ of the vehicle travelling out of the slowdown section at the expected speed of vehicle travelling out of the slowdown section from the current speed of vehicle.

Since the vehicle travels at approximately the same speed on the same road, in this embodiment, the speed of vehicle travelling out of the slowdown section is set to be equal to the speed before the vehicle travels to the slowdown section and slows down, i.e., $V_i$, and the current speed of vehicle should be the safe speed of vehicle $V_k$ travelling into the slowdown section. Therefore, a calculation formula of the acceleration $a_2$ is:

$$a_2 = \frac{V_i^2 - V_k^2}{2L}$$

Step 3: Calculate, based on the total mass of the vehicle, the acceleration increment of the vehicle travelling on the slowdown section, and the acceleration of the vehicle travelling out of the slowdown section, the driving force to be increased $\Delta F_2$:

$$\Delta F_2 = M(a_2 - \Delta a)$$

Step 4: Convert, according to the driveline parameters of the vehicle, the driving force to be increased into the engine output torque to be increased $\Delta T_2$.

It should be noted that when the slowdown section is a multi-type composite section, the acceleration increment of the vehicle travelling on the slowdown section is a sum of acceleration increments caused by all types of sections:

$$\Delta a = \Delta a_1 + \Delta a_2 + \ldots + \Delta an.$$

$\Delta a_1$, $\Delta a_2$, $\Delta an$, etc. respectively correspond to different types of sections in the composite section.

The acceleration increments corresponding to different slowdown sections may be positive or negative. If the slowdown section is the downhill section, the acceleration increment is positive. If the slowdown section is a curve section, since the resistance caused by the curvature of the curve may reduce the speed of vehicle, the corresponding acceleration increment is negative.

After the engine output torque to be increased $\Delta T_2$ is obtained, step 5 may be performed: adjust the EGR rate of the vehicle.

(3) Further this embodiment further includes: when the vehicle travels out of the slowdown section, the EGR rate is adjusted such that the EGR rate is restored to the value before adjustment, i.e., the value before the adjustment (1).

Embodiment I of the present invention realizes predictive EGR control through the electronic horizon. By making full use of the information of the terrain ahead provided in the electronic horizon, before the vehicle running at a high load enters the slowdown section, an EGR valve can be opened in advance to increase the EGR rate, thereby reducing harmful gas emissions. At this time, the torque lost for reducing emissions can make the vehicle steadily slow down by a certain rate within an acceptable range. After the vehicle passes through the slowdown environment, the EGR rate is reduced or the EGR is turned off to restore the torque so that the speed of vehicle is increased to the original value. In this way, even in the case of heavy load, the time of the EGR being on can be fully increased by utilizing the terrain environment, thereby further achieving the effects of energy conservation and emission reduction.

Embodiment II

The present invention further provides a predictive EGR control terminal device, including a memory, a processor, and a computer program stored in the memory and capable of running in the processor. The processor, when executing the computer program, implements the steps in the method embodiment in Embodiment I of the present invention.

Further, as a feasible implementation, the predictive EGR control terminal device may be an on-board computer, a cloud server or other computing devices. The predictive EGR control terminal device may include, but not limited to, a processor and a memory. It can be understood by those skilled in the art that the composition of the predictive EGR control terminal device is merely an example of the predictive EGR control terminal device, and does not constitute a limitation to the predictive EGR control terminal device. The predictive EGR control terminal device may include more or less components than the above, or a combination of some components, or different components. For example, the predictive EGR control terminal device may further include input-output devices, network access devices, buses, etc., which is not limited by the embodiment of the present invention.

Further, as a feasible implementation, the processor may be a central processing unit (CPU), other general-purpose processors, a digital signal processor (DSP), an application specific integrated circuit (ASIC), a field-programmable gate array (FPGA) or other programmable logic devices, a discrete gate or transistor logic device, a discrete hardware component, etc. The general-purpose processor may be a microprocessor, or the processor may also be any conventional processor, etc. The processor is the control center of the predictive EGR control terminal device, and connects all parts of the entire predictive EGR control terminal device using various interfaces and lines.

The memory can be used for storing the computer program and/or module. The processor implements various functions of the predictive EGR control terminal device by running or executing the computer program and/or module stored in the memory and calling the data stored in the memory. The memory may mainly include a program storage area and a data storage area. The program storage area may store an operating system and application programs required by at least one function. The data storage area may store data created according to the use of a mobile phone, etc. Besides, the memory may include a high-speed random access memory, and may further include a non-volatile memory, such as a hard disk, an internal memory, a plug-in hard disk, a smart media card (SMC), a secure digital (SD) card, a flash card, at least one disk memory device, a flash memory device, or other volatile solid-state memory devices.

The present invention further provides a computer-readable storage medium having a computer program stored thereon. The computer program, when executed by a processor, implements the steps in the method in the embodiments of the present invention.

If an integrated module/unit of the predictive EGR control terminal device is implemented in the form of a software functional unit and sold or used as an independent product, it can be stored in the computer-readable storage medium. Based on such understanding, the implementation of all or part of the processes in the method of the embodiments of the present invention may also be completed by instructing related hardware by the computer program. The computer program may be stored in a computer-readable storage medium. The computer program, when executed by the processor, can implement the steps in the method embodiments. The computer program includes a computer program code, which may be in the form of a source code, an object code or an executable file, or in some intermediate forms. The computer-readable medium may include: any entity or apparatus capable of carrying the computer program code, a recording medium, a USB flash drive, a removable hard drive, a magnetic disk, an optical disk, a computer memory, a read-only memory (ROM), a random access memory (RAM), a software distribution medium, etc.

Although the present invention has been specifically shown and described in connection with the preferred implementations, it should be understood by those skilled in the art that various changes in form and details can be made without departing from the spirit and scope of the present invention as defined by the appended claims, and shall all fall within the protection scope of the present invention.

The invention claimed is:

1. A predictive exhaust gas recirculation (EGR) control method, comprising:
   determining, according to electronic horizon data ahead of a vehicle, whether there is a slowdown section ahead of the vehicle, wherein the slowdown section is an area where the vehicle is to slow a travelling speed; and
   when there is the slowdown section ahead of the vehicle, calculating at least one of:
      an engine output torque to be reduced for travelling from a current position of the vehicle to a start position of the slowdown section, thereby adjusting an EGR rate of the vehicle at the current position of the vehicle according to the engine output torque to be reduced,
      an engine output torque to be increased for travelling from the start position of the slowdown section to an end position of the slowdown section, thereby adjusting the EGR rate of the vehicle at the start position of the slowdown section according to the engine output torque to be increased;
   wherein calculating the engine output torque to be reduced comprises:
      calculating, based on a current speed of the vehicle, a safe speed of the vehicle travelling into the slowdown section, and a distance between the current position of the vehicle and the start position of the slowdown section, an acceleration of the vehicle uniformly slowing down from the current speed of the vehicle to the safe speed of the vehicle to obtain a calculated acceleration;
      calculating, based on the calculated acceleration and a total mass of the vehicle, a driving force to be reduced; and
      converting, according to driveline parameters of the vehicle, the driving force to be reduced into the engine output torque to be reduced; and wherein calculating the engine output torque to be increased comprises:
calculating, according to a type of the slowdown section, an acceleration increment of the vehicle travelling on the slowdown section;
calculating, based on the current speed of the vehicle, an expected speed of the vehicle travelling out of the slowdown section, and a length of the slowdown section, an acceleration of the vehicle travelling out of the slowdown section at the expected speed of the vehicle travelling out of the slowdown section from the current speed of the vehicle;
calculating, based on the total mass of the vehicle, the acceleration increment of the vehicle travelling on the slowdown section, and the acceleration of the vehicle travelling out of the slowdown section, a driving force to be increased; and
converting, according to the driveline parameters of the vehicle, the driving force to be increased into the engine output torque to be increased.

2. The predictive EGR control method according to claim 1, wherein when the slowdown section is a multi-type composite section, the safe speed of the vehicle travelling into the slowdown section is a minimum value in safe speeds of the vehicle corresponding to all types of sections.

3. The predictive EGR control method according to claim 1, wherein the safe speed of the vehicle is a speed of the vehicle reduced by m % relative to the current speed of the vehicle, wherein m≤5.

4. The predictive EGR control method according to claim 1, wherein adjusting the EGR rate of the vehicle according to the engine output torque to be reduced comprises:
adjusting, when the engine output torque to be reduced is greater than an engine output torque to be reduced for increasing the EGR rate of the vehicle from a current value to a maximum value, the EGR rate of the vehicle to the maximum value; and
otherwise, increasing the EGR rate of the vehicle such that the engine output torque is reduced by the engine output torque to be reduced.

5. The predictive EGR control method according to claim 1, wherein when the slowdown section is downhill, the acceleration increment of the vehicle travelling on the slowdown section is a product of a gradient value and a gravity acceleration.

6. The predictive EGR control method according to claim 1, wherein when the slowdown section is a multi-type composite section, the acceleration increment of the vehicle travelling on the slowdown section is a sum of acceleration increments caused by all types of sections.

7. The predictive EGR control method according to claim 1, wherein adjusting the EGR rate of the vehicle according to the engine output torque to be increased comprises:
reducing, according to a table of EGR rate-torque relationships, the EGR rate of the vehicle such that the engine output torque is increased by the engine output torque to be increased.

8. The predictive EGR control method according to claim 1, further comprising:
adjusting, when the vehicle travels out of the slowdown section, the EGR rate such that the EGR rate is restored to a value before adjustment.

9. A predictive EGR control terminal device, comprising a processor, a memory, and a computer program stored in the memory and running in the processor, wherein the processor, when executing the computer program, implements steps in the predictive EGR control method according to claim 1.

10. A non-transitory computer-readable storage medium having a computer program stored thereon, wherein the computer program, when executed by a processor, implements steps in the predictive EGR control method according to claim 1.

* * * * *